(12) United States Patent
Mangiagli et al.

(10) Patent No.: US 10,451,091 B2
(45) Date of Patent: Oct. 22, 2019

(54) SERVO WITH INCREASED RELEASE FORCE

(71) Applicant: Sonnax Transmission Company, Bellows Falls, VT (US)

(72) Inventors: Todd V. Mangiagli, Westminster, VT (US); Randall R. Schroeder, Ventura, CA (US)

(73) Assignee: Sonnax Transmission Company, Bellows Falls, VT (US)

( * ) Notice: Subject to any disclaimer, the term of this patent is extended or adjusted under 35 U.S.C. 154(b) by 174 days.

(21) Appl. No.: 15/639,884

(22) Filed: Jun. 30, 2017

(65) Prior Publication Data

US 2018/0003201 A1 Jan. 4, 2018

Related U.S. Application Data

(60) Provisional application No. 62/356,997, filed on Jun. 30, 2016.

(51) Int. Cl.
| | |
|---|---|
| *F15B 15/14* | (2006.01) |
| *F16H 61/30* | (2006.01) |
| *F16D 25/08* | (2006.01) |
| *F16H 61/00* | (2006.01) |
| *F15B 11/036* | (2006.01) |
| *F16H 63/30* | (2006.01) |

(52) U.S. Cl.
CPC ........ *F15B 15/1409* (2013.01); *F15B 15/149* (2013.01); *F15B 15/1447* (2013.01); *F15B 15/1457* (2013.01); *F16D 25/08* (2013.01); *F16H 61/30* (2013.01); *F15B 11/0365* (2013.01); *F15B 2211/7056* (2013.01); *F16H 2061/0062* (2013.01); *F16H 2063/303* (2013.01); *F16H 2063/3033* (2013.01)

(58) Field of Classification Search
CPC ...... F16D 25/062; F16D 25/083; F16D 25/14; F16H 2061/308
USPC .......................... 188/77 R; 192/85 R, 86, 221
See application file for complete search history.

(56) References Cited

U.S. PATENT DOCUMENTS

| | | | | |
|---|---|---|---|---|
| 3,136,399 | A * | 6/1964 | Granryd ................ | B60T 11/103 188/170 |
| 4,787,494 | A * | 11/1988 | Ogasawara ............. | F16D 49/08 188/151 R |
| 5,253,549 | A | 10/1993 | Younger | |
| 5,730,685 | A | 3/1998 | Younger | |
| 5,944,627 | A * | 8/1999 | Darling-Owen ........ | F16D 65/16 188/77 W |
| 6,422,356 | B1 * | 7/2002 | Suzuki ................ | F16H 63/3003 188/336 |
| 6,899,211 | B2 | 5/2005 | Carne | |
| 7,047,611 | B1 | 5/2006 | Rowell et al. | |
| 8,250,967 | B2 * | 8/2012 | Beattie, Jr. .......... | F16H 63/3026 92/110 |
| 9,382,924 | B2 | 7/2016 | Dumas | |

* cited by examiner

*Primary Examiner* — F Daniel Lopez
*Assistant Examiner* — Matthew Wiblin
(74) *Attorney, Agent, or Firm* — Downs Rachlin Martin PLLC (57) ABSTRACT

Methods of modifying a GM Powerglide low range servo assembly for high line pressure applications as well as replacement components for Powerglide low range servo assemblies and replacement low range servo assemblies.

28 Claims, 9 Drawing Sheets

SERVO WITH INCREASED RELEASE FORCE

RELATED APPLICATION DATA

This application claims the benefit of priority of U.S. Provisional Patent Application Ser. No. 62/356,997, filed Jun. 30, 2016, and titled Servo With Increased Release Force, which is incorporated by reference herein in its entirety.

FIELD OF THE INVENTION

The present invention generally relates to the field of servos. In particular, the present invention is directed to servos with increased release force.

BACKGROUND

The Powerglide transmission was one of the first automatic transmissions developed by General Motors. Although General Motors phased it out in 1973, the basic design is still used today, especially in niche automotive applications, including in automobile power trains designed for racing. The Powerglide transmission has remained popular for racing due, in part, to the strength, durability, and simplicity of the design. Indicative of the Powerglide's continued popularity, it is possible to build an entire Powerglide transmission from aftermarket parts, and a cottage industry has developed around improving the performance of the Powerglide transmission for racing applications. Because of this history, entire transmissions as well as complete replacement parts built to original equipment ("OE") dimensions and specifications continue to be readily available in the market. Thus, for the sake of clarity, "OE" as used herein refers not only to transmissions and parts manufactured by the original manufacturer but also to any aftermarket transmissions or parts conforming to the OE dimensions and specifications. Similarly, "Powerglide," "OE Powerglide" and "GM Powerglide" as used herein refer not only to Powerglide transmissions and parts originally manufactured by General Motors but also to any aftermarket transmissions or parts conforming to the OE dimensions and specifications.

When GM Powerglide transmissions are used in drag racing and other high performance applications, transmission line pressure is typically increased for better clutch holding power and quicker shifts. Powerglide transmissions have three friction apply elements: two multidisc wet clutches (High clutch and Reverse Clutch) for high range (also referred to as second gear or high gear) and reverse, respectively, and one double wrap band (Low Band) for low range (also referred as first gear or low gear). Table 1, below, shows which friction apply element is engaged for each gear and shows that only one friction apply element is applied at a time.

TABLE 1

|  | Low Band | High Clutch | Reverse Clutch |
| --- | --- | --- | --- |
| Park/Neutral | off | off | off |
| Reverse | off | off | applied |
| low range (1$^{st}$ gear/low gear) | applied | off | off |
| high range (2$^{nd}$ gear/high gear) | off | applied | off |

Figure 1:
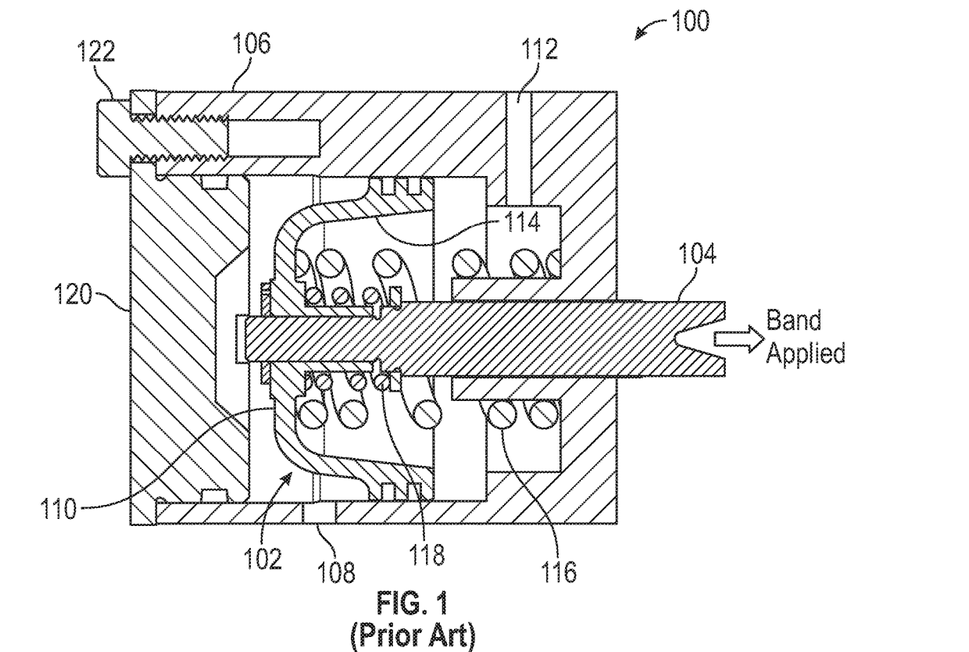
FIG. 1 is a cross sectional view of a prior art Powerglide low range servo assembly.
Figure 2:
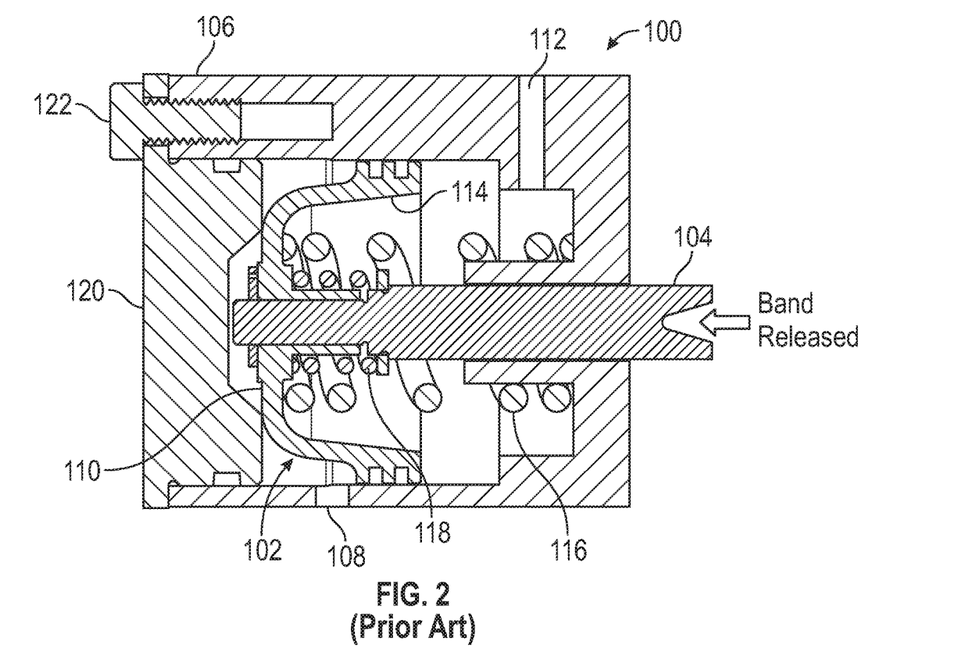
FIG. 2 is a cross sectional view of the prior art Powerglide low range servo assembly of FIG. 1.

FIGS. 1 and 2 are cross sectional views of a prior art Powerglide low range servo assembly 100, with FIG. 1 showing the servo assembly applied and FIG. 2 showing it released. Servo assembly 100 includes a servo piston 102 attached to a servo pin 104, which are both slidably disposed in a transmission case 106. Transmission case 106 includes an apply oil passageway 108 for routing pressurized apply oil to an apply side 110 of servo piston 102 and a release oil passageway 112 for routing pressurized release oil to a release side 114 of the servo piston. As used herein "apply oil" and "release oil" both refer to pressurized transmission fluid, with the terms apply oil and release oil referring to transmission fluid that is being routed to a servo for either applying or releasing the servo. "Line pressure" refers to the pressure of the transmission fluid. Thus, an increase in line pressure results in an increase in both the apply and release oil pressures. Servo assembly 100 also includes two release springs 116, 118 for biasing servo piston 102 and servo pin 104 to the release position (FIG. 2) and a cover 120 for sealing the servo assembly 100 within transmission case 106, attached to the transmission case by bolts 122 (only one of three shown).

In Park, Reverse, and Neutral, servo assembly 100 is in the released position (FIG. 2) and the low band (not shown) is released. To engage low range, pressurized apply oil is directed to apply side 110 of servo piston 102 via apply oil passageway 108, causing the servo piston and servo pin 104 to move from a released position (FIG. 2) to an applied position (FIG. 1), thereby engaging the low band on the high clutch drum (not illustrated). When the transmission is shifted from low range to high range, the low band is released by directing pressurized release oil to the release side 114 of servo piston 102 via release oil passageway 112, causing the piston to retract back to the release position (FIG. 2). In both low range and high range, pressurized apply oil is present and acting on the apply side 110 of servo piston 102 and additional pressurized fluid (release oil) is added to the release side 114, thereby counteracting the apply oil force and allowing release springs 116, 118 to move servo piston 102 to the release position (FIG. 2).

The release side 114 has less surface area than the apply side 110 due to the cross sectional area of servo pin 104. Release springs 116, 118 are sized to provide sufficient force to overcome the force differential caused by this area differential between the release side 114 and apply side 110 of servo piston 102. The spring force of release springs 116, 118 is optimized to provide sufficient force to move the servo piston when the release oil is applied while also not being over-sized to thereby minimize the magnitude of apply oil pressure required to overcome the spring force when servo assembly is applied to engage the band in low range.

When line pressure is increased for high performance applications, both the apply oil and release oil pressure increase, which can cause the low band to drag in high gear due to the area differential between the release side 114 and apply side 110, resulting in a larger force imbalance, which the OE release springs 116, 118 were not designed for.

SUMMARY OF THE DISCLOSURE

In one implementation, the present disclosure is directed to an automotive transmission servo assembly. The automotive transmission servo assembly includes a servo pin configured to be operably coupled to a clutch band, and at least one piston for providing a total apply area configured to receive a pressurized apply oil and a total release area configured to receive a pressurized release oil wherein the total release area is greater than the total apply area.

In another implementation, the present disclosure is directed to a kit for modifying an automotive transmission servo assembly. The kit includes a servo pin configured to be operably coupled to a clutch band, and at least one piston for providing a total apply area configured to receive a pressurized apply oil and a total release area configured to receive a pressurized release oil wherein the total release area is substantially equal to or greater than the total apply area.

In still another implementation, the present disclosure is directed to a method of modifying a release force of an existing automotive transmission servo assembly having an existing servo pin and an existing piston attached to the existing servo pin, the existing servo assembly having a total apply area that is greater than a total release area. The method includes providing a replacement servo assembly including a replacement servo pin and a plurality of replacement pistons, wherein a total release area of the replacement servo assembly is greater than a total apply area of the replacement servo assembly and replacing the existing servo pin and piston with the replacement servo assembly.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 3:
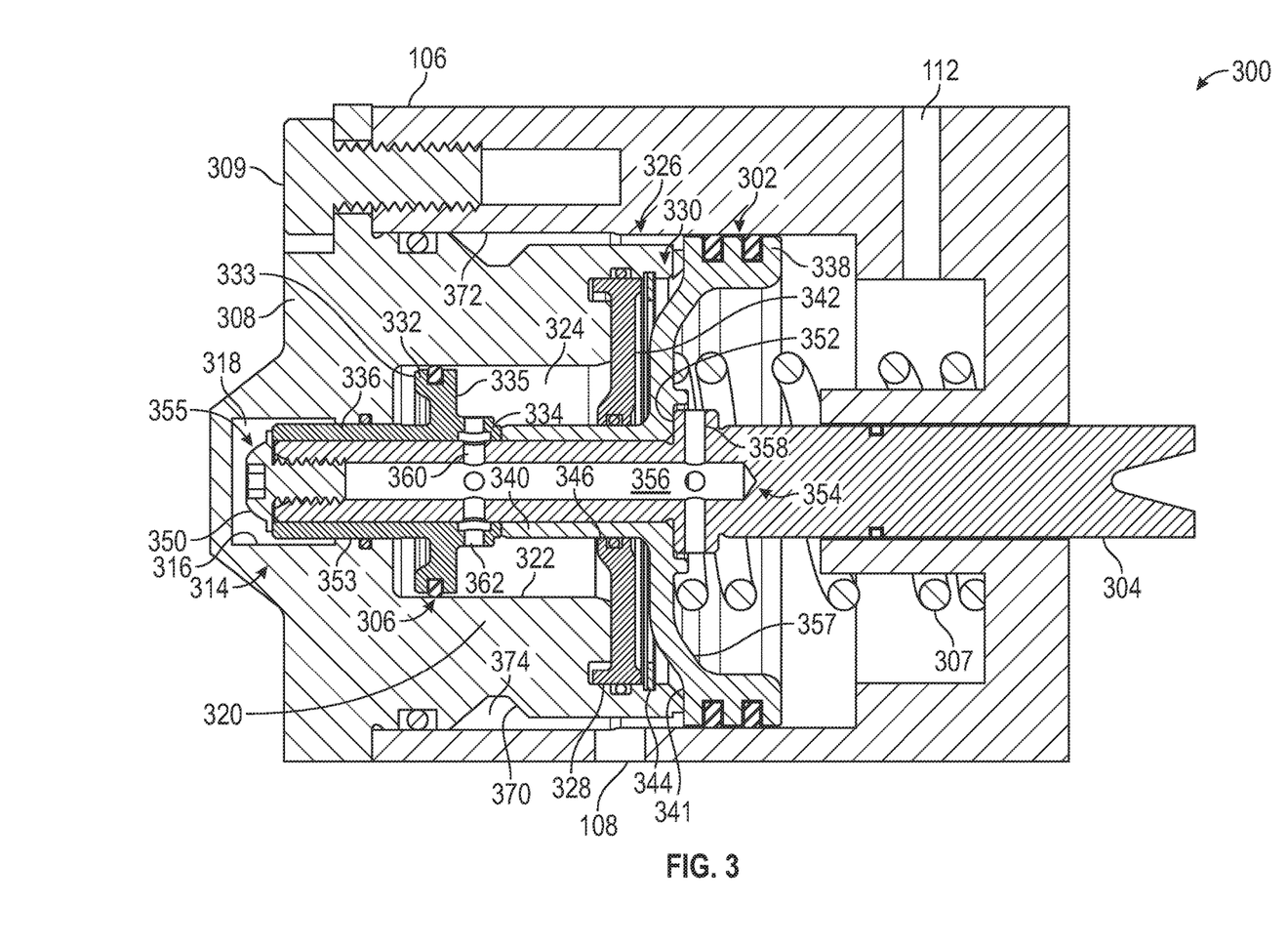
FIG. 3 is a cross sectional view of a low range servo assembly.

The present disclosure includes methods of modifying a GM Powerglide low range servo assembly, including modifying for high line pressure applications, as well as replacement components for Powerglide low range servo assemblies and replacement low range servo assemblies. FIG. 3 shows one example of a low range servo assembly 300 disposed in a prior art Powerglide transmission case 106 (FIGS. 1 and 2). Servo assembly 300 includes an apply piston 302 attached to a servo pin 304, which are both slidably disposed in prior art transmission case 106. Unlike prior art servo assembly 100 (FIG. 1), servo assembly 300 includes a plurality of pistons, and in this example, in addition to apply piston 302, the servo assembly also includes a release piston 306, which is also attached to servo pin 304 and slidably disposed in OE case 106. As discussed more below, in the illustrated example, apply oil is only routed to apply piston 302 and not release piston 306, however, release oil is routed to both the apply and release pistons, which results in the release oil acting on a larger surface area than the apply oil. This can allow for an increase in line pressure (resulting in increased apply and release oil pressure) without negatively impacting the ability of the servo assembly to release as is the case with prior art servo assembly 100 (FIG. 1). Low range servo assembly 300 also includes a release spring 307 that biases servo pin 304 to a release position.

In one example, a method of modifying a release force of an existing automotive transmission servo assembly, e.g., prior art servo assembly 100, having an existing servo pin, e.g., prior art servo pin 104 and an existing piston attached to the existing servo pin, e.g., prior art piston 102, where the existing servo assembly has a total apply area, e.g., a surface area of apply side 110 of piston 102, that is greater than a total release area, e.g., a surface area of release side 114 of piston 102, includes providing a replacement servo assembly, e.g., low range servo assembly 300, including a replacement servo pin, e.g., servo pin 304 and a plurality of replacement pistons, e.g., apply piston 302 and release piston 306, wherein a total release area of the replacement servo assembly is greater than a total apply area of the replacement servo assembly. In the illustrated example, a total release area is greater than a total apply area because release oil is routed to both the release piston 306 and apply piston 302, whereas apply oil is only routed to the apply piston and not the release piston. The method can also include replacing the existing servo pin and piston with the replacement servo assembly to achieve an increased release force, and in some examples, achieving a greater release force while maintaining substantially the same apply force.

In the example shown, servo pin 304 has a greater axial length than OE servo pin 104 (FIG. 1), which is accommodated by a cover 308 secured to case by cover bolts 309 (one of e.g., three shown). Cover 308 includes a first portion 314 that includes an inner wall 316 that defines a servo pin cavity 318, a second portion 320 that includes an inner wall 322 that defines a release piston cavity 324, and a third portion 326 that includes an inner wall 328 that defines an oil separator cavity 330. Release piston 306 includes a crown 332, a first cylindrical portion 334 on a release side 335 of the crown and a second cylindrical portion 336 on an opposite side 333 of the crown. Apply piston 302 similarly includes a crown 338 and cylindrical portion 340 on an apply side 341 of the crown. Assembly 300 also includes an oil separator 342 located between release piston 306 and apply piston 302 that is fixed to cover 308 with a retaining ring 344. Oil separator 342 includes an inner wall 346 that defines an annular opening sized for sliding engagement with an outer surface of cylindrical portion 340 of apply piston 302. Oil separator 342 provides a fluid boundary between apply piston 302 and release piston 306 such that apply oil routed to the apply piston does not act on the release piston. Apply piston 302 and release piston 306 are each sized to be slid over an outer surface of servo pin 304 and secured in place by retaining screw 350. When installed on servo pin 304, crown 338 of apply piston 302 is sized to abut a shoulder 352 on the servo pin and cylindrical portion 340 of the apply piston is sized to abut first cylindrical portion 334 of the release piston. Release piston crown 332 is configured to be slidably disposed in release piston cavity 324, while second cylindrical portion 336 of the release piston is sized to slidably engage and form a fluid-tight seal with a portion 353 of the inner wall of cover 308, thereby providing a fluid-tight barrier between servo pin cavity 318 and release piston cavity 324.

Servo pin 304 includes an inner fluid passageway 354 that extends along a longitudinal axis of the servo pin and that places a release side 357 of apply piston 302 in fluid communication with release piston cavity 324 and release piston 306. In the illustrated example, retaining screw 350 provides a dual function of both securing the release and apply pistons 306, 302 to servo pin 304 and also sealing the servo pin fluid passageway at end 355 of the servo pin. Inner fluid passageway 354 has an axial portion 356, a first transverse portion 358 that extends from the axial portion to an outer surface of servo pin 304, and a second transverse portion 360 that extends from the axial portion to an outer surface of the servo pin. First cylindrical portion 334 of release piston 306 has at least one fluid passage 362 configured to provide fluid communication between second transverse portion 360 of inner fluid passageway 354 and release piston cavity 324.

An outer dimension of a portion of outer wall 370 of cover 308 is sized to be spaced from an inner wall 372 of case 106 to define an annular region 374 that is in fluid communication with OE case apply oil passageway 108. Annular region 374 and oil separator 342 cooperate to allow apply oil to act on apply side 341 of apply piston 302 while not acting on release piston 306. As with OE servo assembly 100, release oil passageway 112 routes release oil to release side 357 of apply piston 302. Servo pin inner fluid passageway 354 then routes a portion of the release oil to release side 335 of release piston 306.

Figure 4:
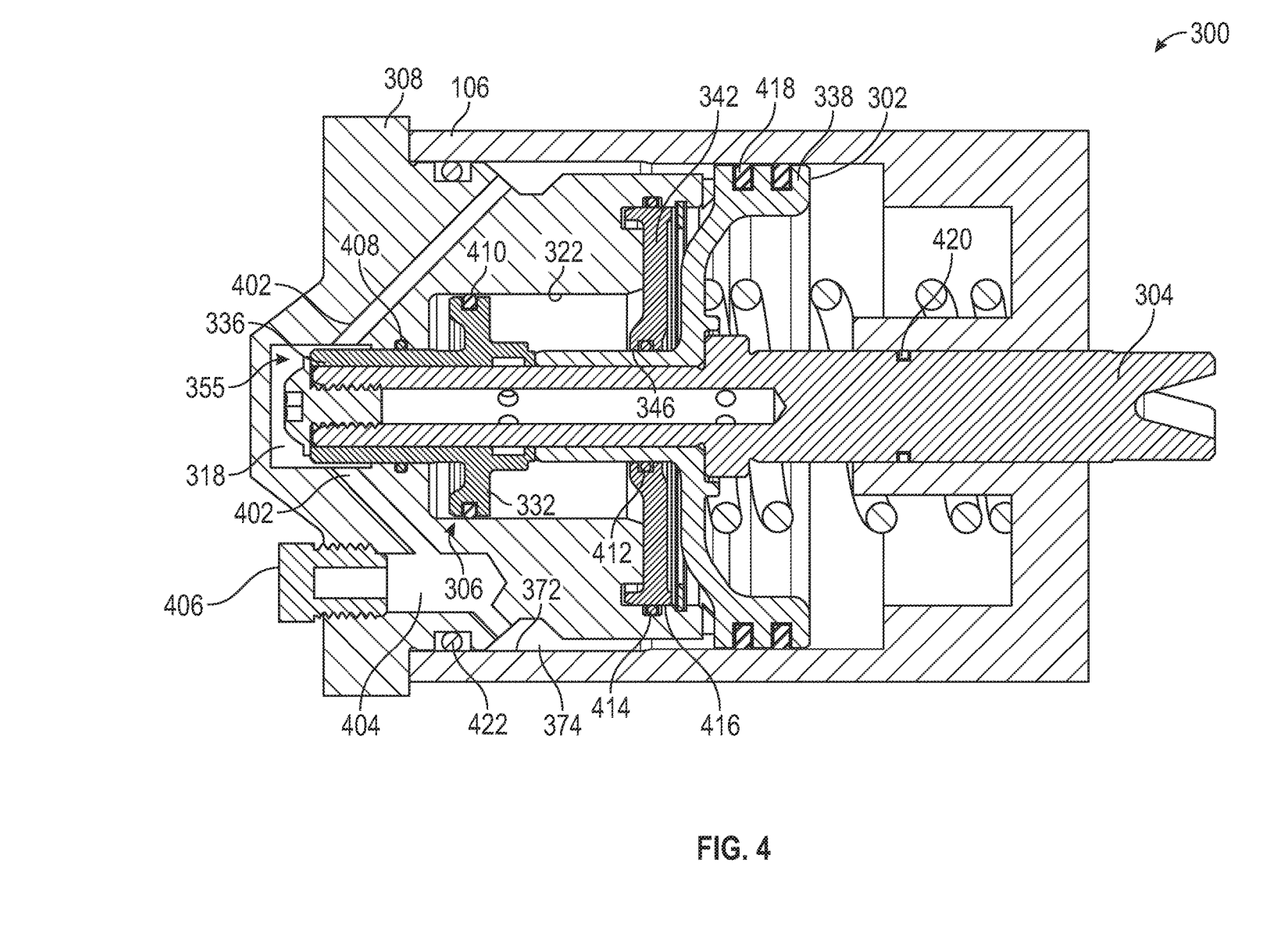
FIG. 4 is a cross sectional view of the low range servo assembly of FIG. 3.

FIG. 4 shows another cross sectional view of low range servo assembly 300, with the cross section taken through a different plane than the cross section shown in FIG. 3. As shown in FIG. 4 assembly 300 also includes cover apply oil passageways 402 that route apply oil from annular region 374 to servo pin cavity 318 to act on end 355 of servo pin 304. By routing apply oil to end 355 in addition to routing apply oil to apply piston 302, a total apply side cross sectional area of assembly 300 normal to a longitudinal axis of servo pin 304 is substantially the same as an apply side cross sectional area of OE assembly 100 normal to servo pin 104 (FIG. 1), which is substantially the same as a cross sectional area of the cavity defined by inner wall 372 of transmission case 106. Servo assembly 300, therefore provides substantially the same apply force to engage the low band as OE servo assembly 100 (assuming the same line pressure and release spring force). In another example, a low range servo assembly made in accordance with the present disclosure may not include cover apply oil passageways. Cover 308 also includes a pressure tap bore 404 that provides access for an external pressure tap measurement, which is sealed with a pressure relief plug 406 when not in use.

As discussed above, assembly 300 includes a plurality of distinct fluid passages for routing and containing pressurized apply and release oil. Second cylindrical portion 336 of release piston 306 is sized to slidably engage and form a fluid tight seal with cover 308 to form servo pin cavity 318. In the illustrated example, first portion 314 of cover includes a fluid sealing member 408, to maintain a fluid seal therebetween. Similarly, a fluid sealing member 410 is located on an outer diameter of crown 332 of release piston 306 for forming a seal with the cover, fluid sealing members 412, 414 are located adjacent inner and outer walls 346, 416 of oil separator 342 for forming a seal with apply piston 302 and the cover, fluid sealing members 418 are located on an outer diameter of crown 338 of the apply piston for forming a seal with case 106, a fluid sealing member 420 is located on an outer wall of servo pin 304 for forming a seal with case 106, and a fluid sealing member 422 is located in the cover for forming a seal with the case. Any of a variety of materials known in the art may be used for the fluid sealing members, such as, for example, an o-ring, d-ring, scarf cut seal, etc. of a polymer member such as, e.g., Polytetrafluoroethylene (PTFE), Polyether ether ketone (PEEK), Nitrile, Neoprene, rubber, synthetic rubber, ethylene propylene diene monomer (EPDM), Fluorocarbon, etc. as is known in the art.

Figure 5:
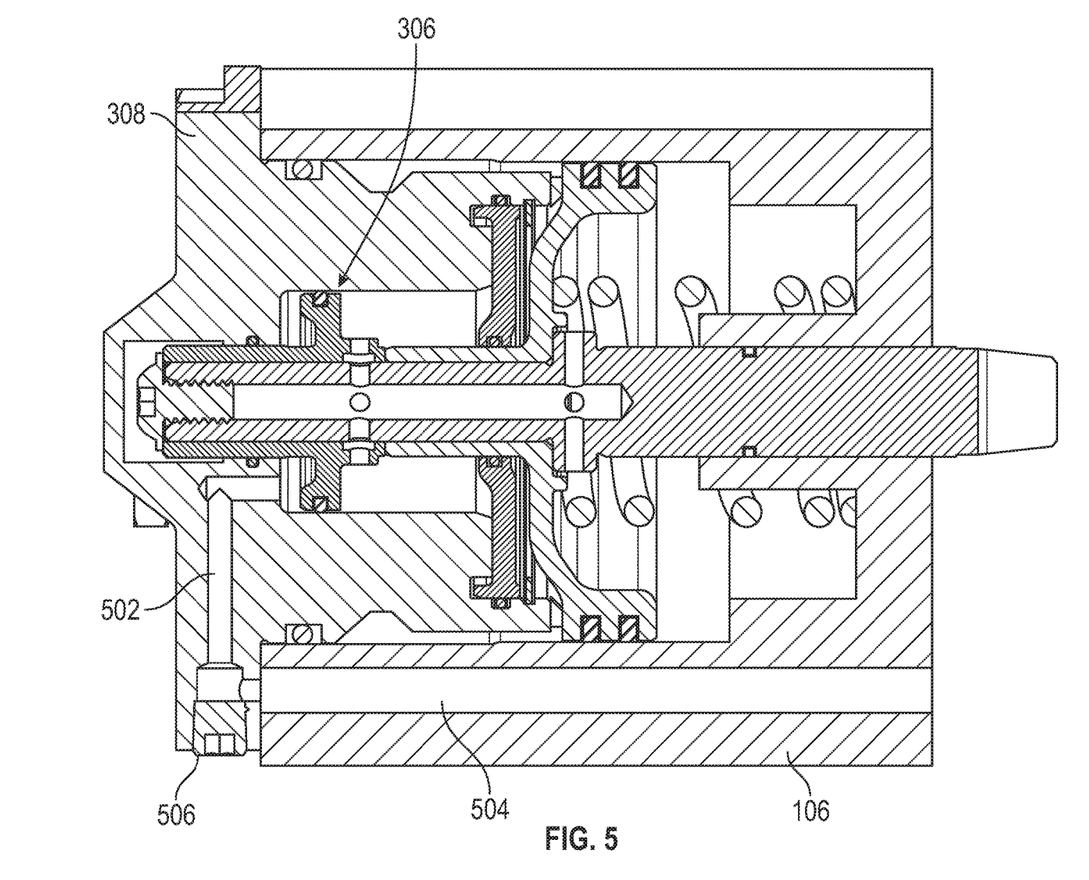
FIG. 5 is a cross sectional view of the low range servo assembly of FIGS. 3 and 4.

FIG. 5 shows another cross sectional view of low range servo assembly 300, with the cross section taken through a different plane than the cross sections shown in FIGS. 3 and 4. As shown in FIG. 5, cover 308 also includes an exhaust passage 502 for routing any oil that leaks past release piston 306 to an exhaust passage 504 in case 106 and an exhaust plug 506 for sealing cover exhaust passage 502.

Figure 6:
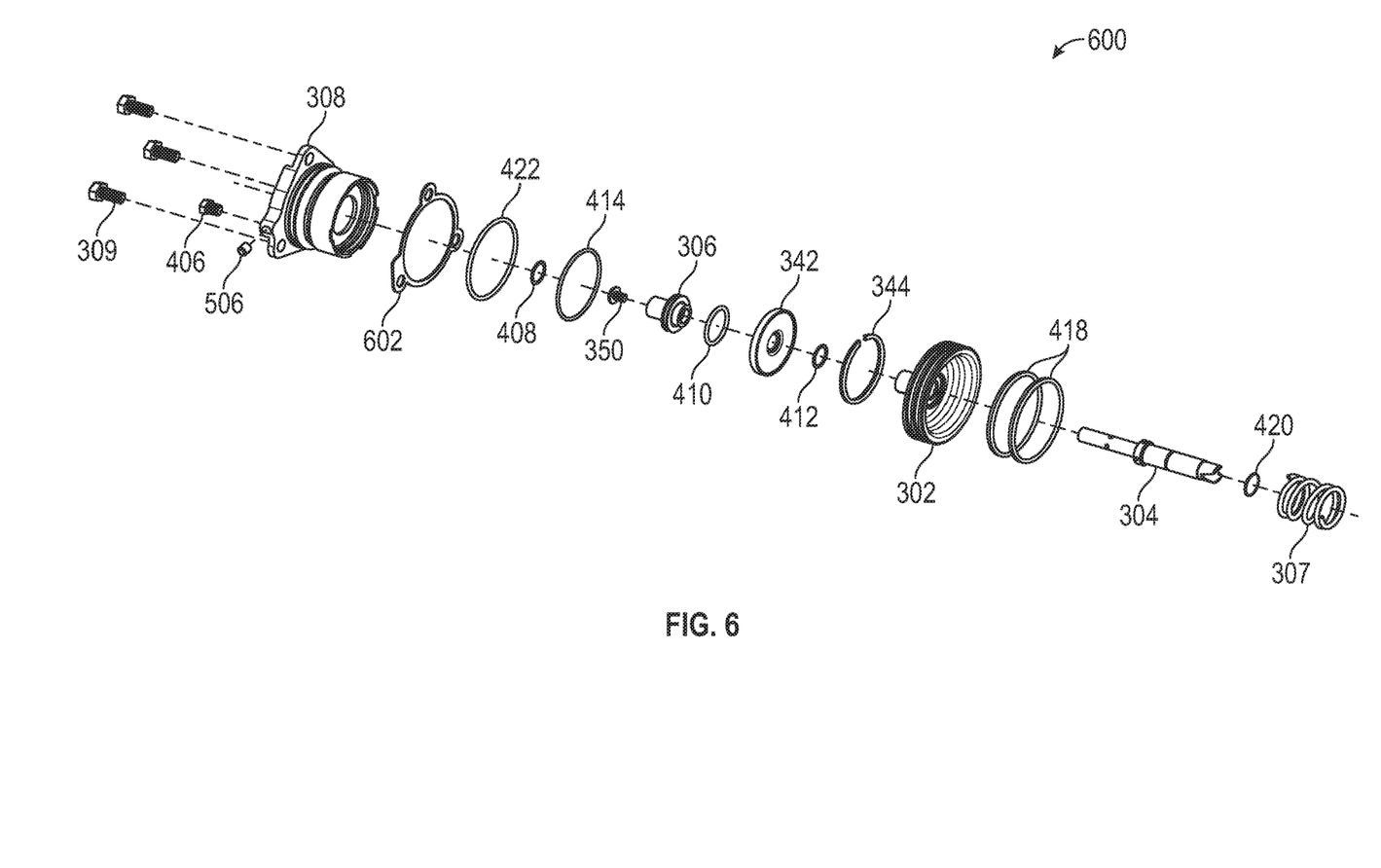
FIG. 6 is an exploded view of a kit for modifying a low range servo assembly.

FIG. 6 is an exploded view of one example of components that may be included in a kit 600 for modifying an OE Powerglide low range servo 100 (FIGS. 1 and 2). Kit 600 may include three cover bolts 309, pressure plug 406, exhaust plug 506, replacement cover 308, cover gasket 602, cover fluid sealing members 422 and 408, oil separator sealing member 414, retaining screw 350, release piston 306, release piston fluid sealing member 410, oil separator 342, oil separator fluid sealing member 412, oil separator retaining ring 344, apply piston 302, apply piston fluid sealing members 418, servo pin 304, servo pin fluid sealing member 420, and release spring 307. As will be appreciated, a kit for modifying an OE Powerglide low range servo may include less than all of the components shown in FIG. 6. Other examples include kits for modifying servo assemblies of transmission models other than the Powerglide transmission.

Figure 7:
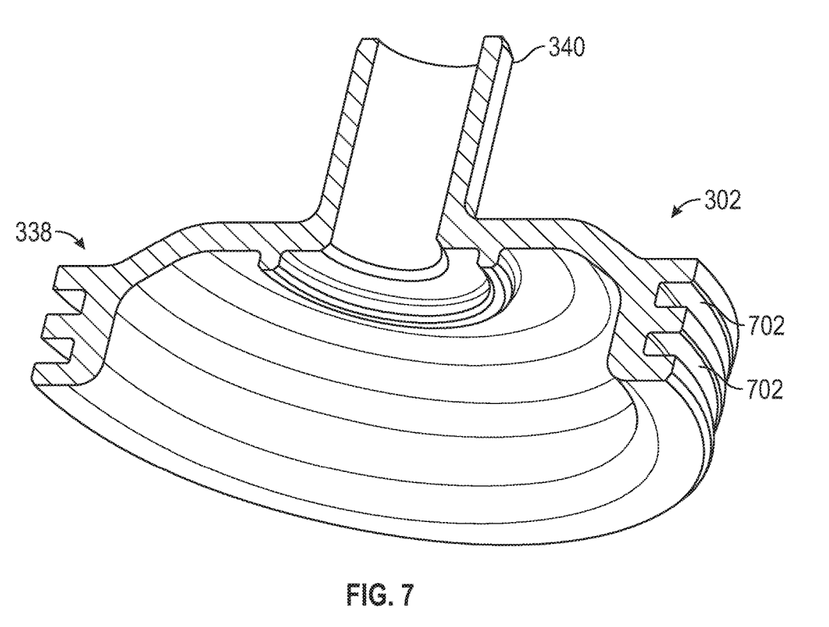
FIG. 7 is a perspective cross sectional view of an apply piston.
Figure 8:
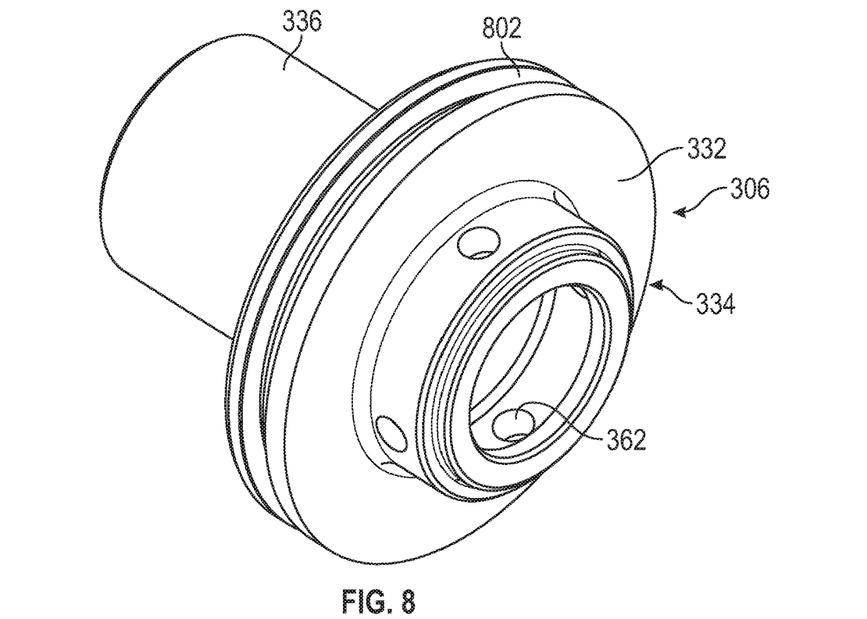
FIG. 8 is a perspective view of a release piston.
Figure 9:
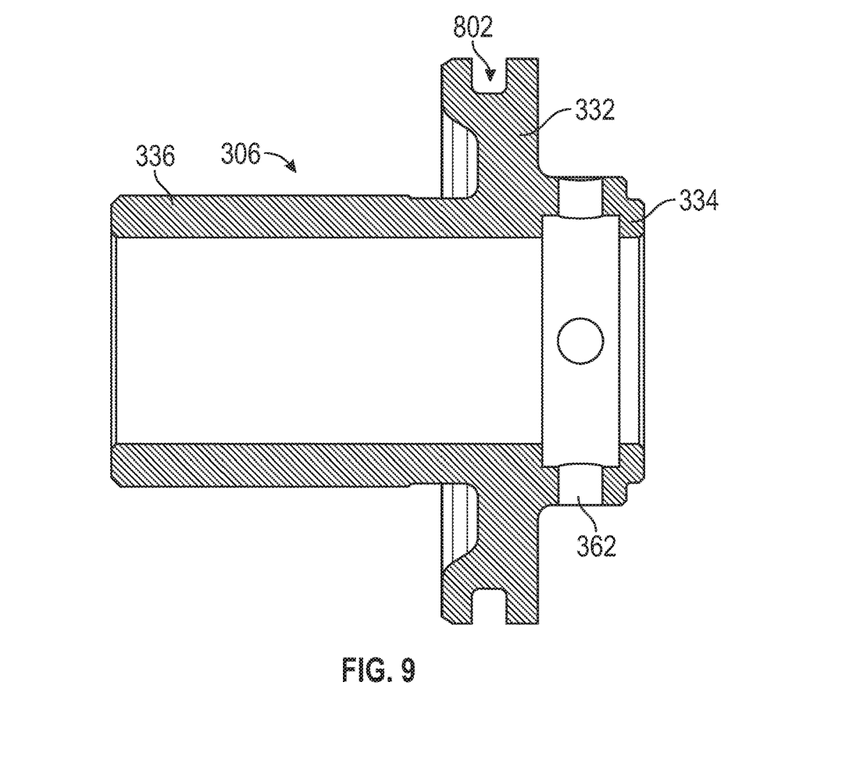
FIG. 9 is a cross sectional view of the release piston of FIG. 8.

FIG. 7 is a perspective cross sectional view of apply piston 302, which includes cylindrical portion 340, crown 338, and recesses 702 in the crown, the recesses being dimensioned to receive fluid sealing members 418. FIGS. 8 and 9 are a perspective view and cross-sectional view, respectively, of release piston 306, showing first and second cylindrical portions 334, 336 integrally formed with crown 332, and fluid passages 362 configured for fluid communication with second transverse portions 360 of servo pin inner fluid passageway 354 (FIG. 3). Crown 332 also includes recess 802 dimensioned to receive fluid sealing member 410 (FIG. 4).

Figure 10:
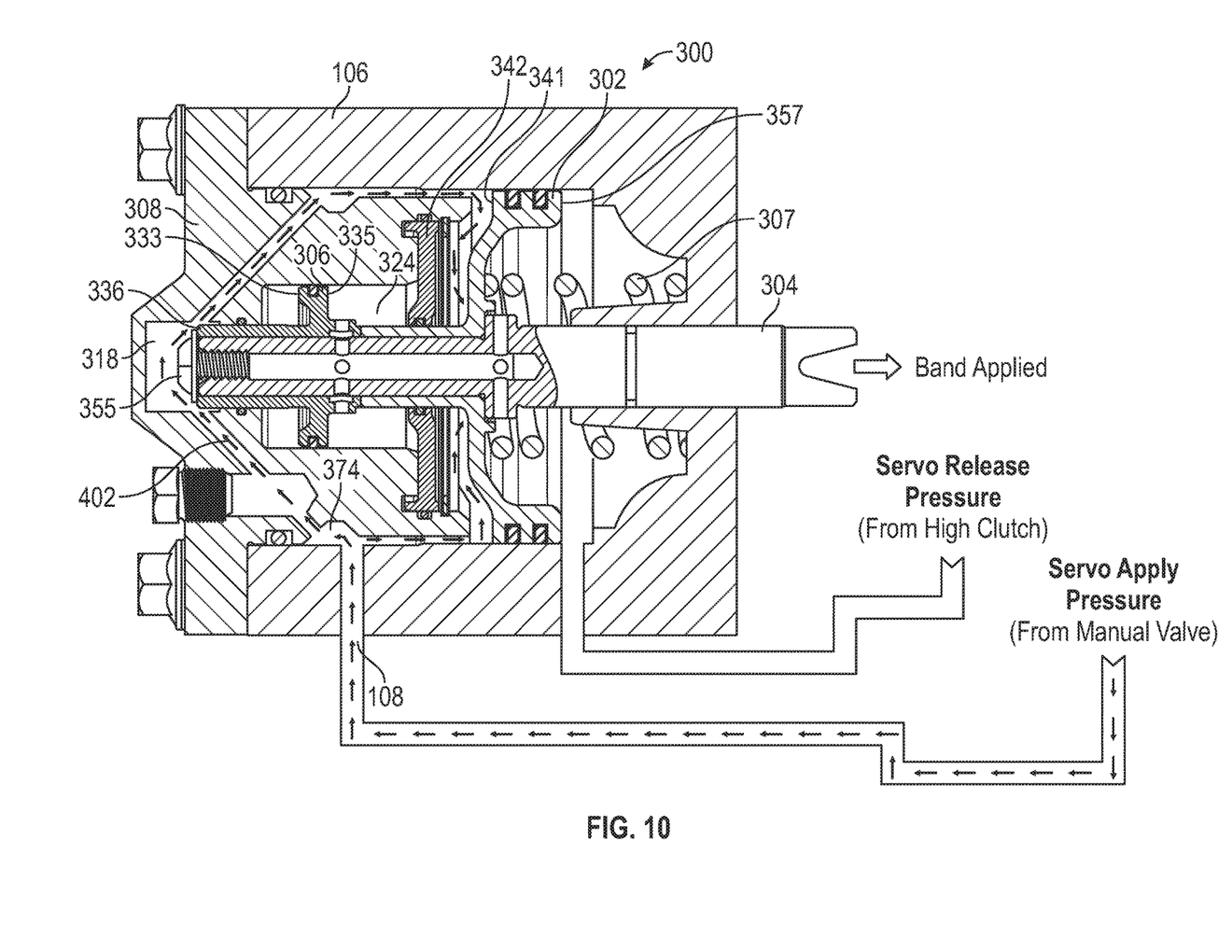
FIG. 10 shows pressurized oil flow in the low range servo assembly of FIGS. 3-5 when low gear is applied.
Figure 11:
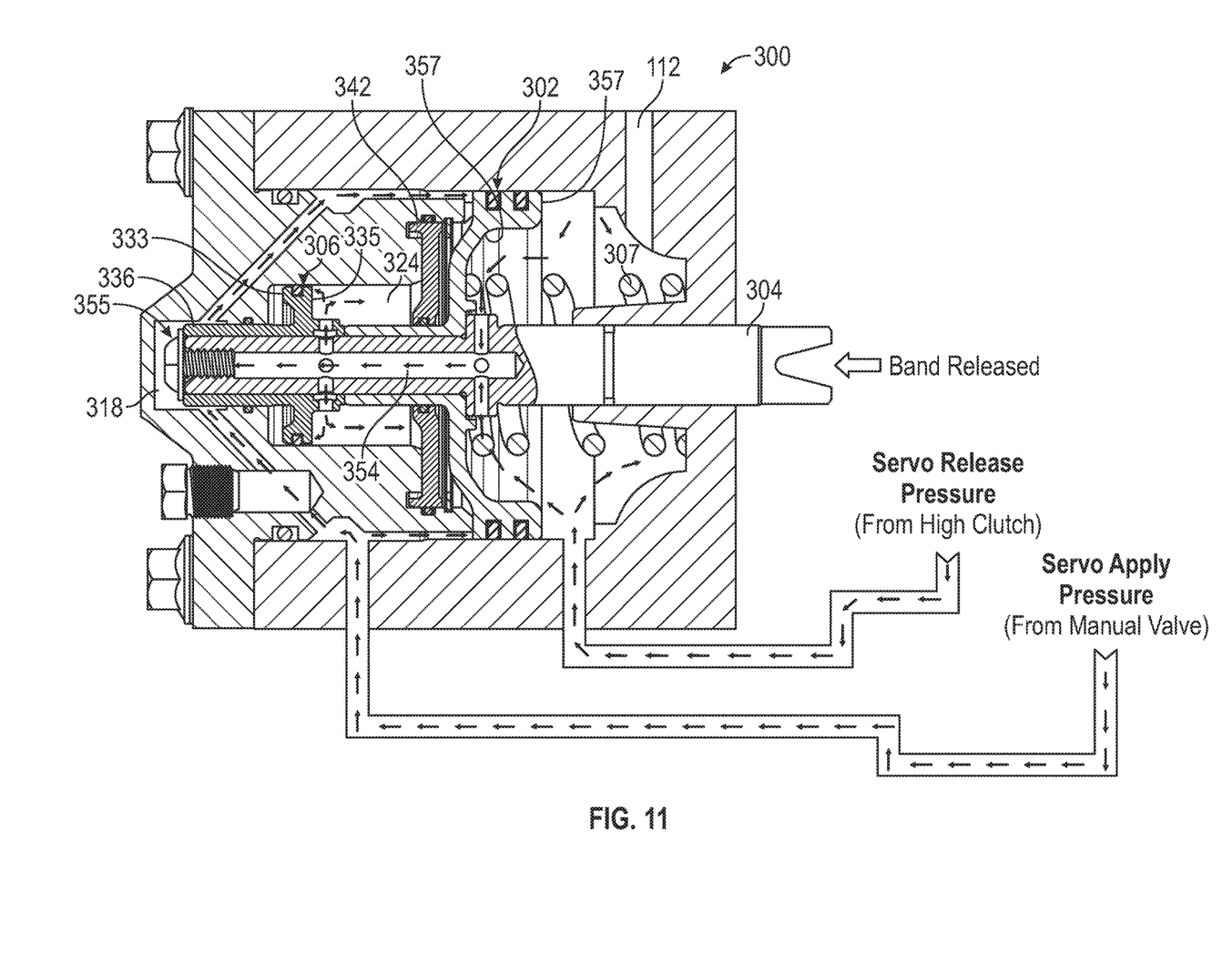
FIG. 11 shows pressurized oil flow in the low range servo assembly of FIGS. 3-5 when high gear is applied.

FIGS. 10 and 11 illustrate pressurized oil flow in low range servo assembly when low gear is applied (FIG. 10) and when it is released (FIG. 11). As shown in FIG. 10, when the transmission is in low gear, pressurized apply oil is routed to apply oil passageway 108. Apply oil enters annular region 374 between cover 308 and case 106 and then passes to cover apply oil passageways 402 and servo pin cavity 318 to act on end 355 of the servo pin, and also passes to apply side 341 of apply piston 302 to act on the apply piston. Apply oil is blocked by oil separator 342 from reaching release piston 306, and is also blocked by the fluid barrier provided by second cylindrical portion 336 of release piston 306 and cover 308 from passing from servo pin cavity 318 to release piston cavity 324. Release side 335 of release piston 306 is, therefore, configured to receive pressurized oil for creating a force, whereas opposite side 333 of the release piston is configured to not receive any pressurized oil. For example, opposite side 333 is configured as a dry side of release piston 306 and the portion of release piston cavity 324 located between the release piston and servo pin cavity 318 is configured to not receive pressurized oil, such as pressurized apply oil and may only receive leakage oil, which can be routed to exhaust passage 502 as described above (FIG. 5).

With the apply oil acting on end 355 of the servo pin and apply piston 302, the force created overcomes the force of release spring 307 and moves the assembly to the right, thereby translating the force applied by the pressurized apply oil on the assembly to servo pin 304 and the low range band (not illustrated). When in low gear, a force applied by servo pin 304 on the low band (not illustrated), is substantially the same as the force applied by OE low range servo assembly 100 (FIG. 1) (when the same line pressure and spring force is used), because the areas the apply oil are acting on in both cases are substantially the same.

As shown in FIG. 11, when the transmission shifts to high gear, apply oil is still applied to servo pin end 355 and apply piston 302 in the same manner as in low gear (FIG. 10). In high gear, pressurized release oil is also directed to assembly 300 via OE release oil passageway 112. Release oil acts on release side 357 of apply piston 302 and is also directed through inner fluid passageway 354 of servo pin 304, which allows the release oil to bypass oil separator 342 and act on release piston 306. The force created by the release oil acting on the apply and release pistons 302, 306 and the force from release spring 307 is greater than the force from the apply oil, thereby causing servo pin 304 to move to the left and release the low band (not illustrated).

The addition of release piston 306 (as compared to OE servo assembly 100) provides an additional surface area for release oil to act on which is not present in OE low range servo assembly, resulting in a greater total release surface area than apply surface area, or a smaller ratio of apply to release surface area. In one example, OE low range servo assembly 100 has a total apply to release area ratio of 1.055. Low range servo assemblies made in accordance with the present disclosure may have a ratio of total apply area to total release area that is less than than 1.0, and in some examples, in the range of approximately 0 to 1 and in some examples, approximately 0.1, or approximately 0.2, or approximately 0.3, or approximately 0.4, or approximately 0.5, or approximately 0.6, or approximately 0.7, or approximately 0.8, or approximately 0.9. Such a ratio allows for an increase in line pressure without negatively impacting the ability of low range servo assembly 300 to release and without requiring a higher strength release spring 307 to maintain the ability to release. In one example, a ratio of total apply area to total release area is selected such that release spring 307 has substantially the same spring force as OE release springs 116, 118 (FIG. 1), while maintaining the same or improved release performance at the same or higher line pressure than OE. In another example, release spring 307 has a lower spring force than OE release spring 116 while maintaining the same or improved release performance at the same or higher line pressure than OE. In another example, a ratio of total apply area to total release area is selected such that the low range servo assembly does not include a release spring while also maintaining at least substantially the same or improved release performance at the same or higher line pressure as OE. By reducing the force of release spring 307, a greater apply force can be achieved for the same line pressure, thereby requiring less of a line pressure increase to achieve the same increase in clutch holding performance.

Examples of low range servos disclosed herein are designed to avoid common problems with OE low range servos, especially when used in high performance applications. The designs disclosed herein utilize more release area than apply area, which helps ensure proper band release in high range even at elevated line pressures. In some examples, the release spring is not relied on for complete band release, and can, therefore, allow more calibration and more total apply force in low range. In some examples, a complete assembly can be provided in a package that bolts directly to an existing OE transmission case.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

What is claimed is:

1. A kit for modifying an automotive transmission existing servo assembly having an existing release spring, an existing servo pin and an existing piston attached to the existing servo pin, the existing servo assembly having a total apply area that is greater than a total release area, the kit comprising:
   a replacement servo pin configured to be operably coupled to a clutch band; and
   at least one replacement piston for providing a total apply area configured to receive a pressurized apply oil and a total release area configured to receive a pressurized release oil;
   wherein the total release area of the at least one replacement piston is greater that the total apply area of the at least one replacement piston;
   wherein the kit does not include a replacement release spring, the replacement servo pin and the at least one replacement piston designed and configured to be installed and operate without the existing release spring or a replacement release spring.

2. The kit according to claim 1, wherein the at least one replacement piston includes a release piston having a crown including a first side configured to receive the release oil for creating a release force and a second side opposite the first side that is configured to not receive any pressurized oil.

3. The kit according to claim 1, further comprising:
a cover having a first portion that defines a servo pin cavity and a second portion that defines a release piston cavity;
wherein the replacement servo pin includes an end configured to be slidably disposed in the servo pin cavity; and
wherein the at least one replacement piston includes an apply piston and a release piston, the release piston having a crown configured to be slidably disposed in the release piston cavity.

4. The kit according to claim 3, wherein the replacement servo pin cavity is configured and dimensioned to not be in fluid communication with the release piston cavity when the cover and replacement servo pin are installed.

5. The kit according to claim 3, wherein the cover includes an apply oil passageway for routing apply oil to the servo pin cavity.

6. The kit according to claim 5, wherein the apply oil passageway is not in fluid communication with the release piston cavity.

7. The kit according to claim 3, wherein the replacement servo pin includes an inner fluid passageway for routing release oil from a release side of the apply piston to the release piston.

8. The kit according to claim 7, wherein the release piston includes a first cylindrical portion that extends from the crown and that includes a fluid passage for providing fluid communication between the inner fluid passageway and the release piston crown.

9. The kit according to claim 8, wherein the release piston includes a second cylindrical portion on an opposite side of the crown from the first cylindrical portion, the second cylindrical portion configured and dimensioned to be slidably disposed in the servo pin cavity and provide a fluid-tight barrier between the servo pin cavity and the release piston cavity.

10. A method of modifying a release force of an existing automotive transmission servo assembly having an existing servo pin and an existing piston attached to the existing servo pin, the existing servo assembly having a total apply area that is greater than a total release area, the method comprising:
providing a replacement servo assembly including a replacement servo pin and a plurality of replacement pistons, wherein a total release area of the replacement servo assembly is greater than a total apply area of the replacement servo assembly; and
replacing the existing servo pin and piston with the replacement servo assembly;
wherein the total apply area of the replacement servo assembly is substantially the same as the total apply area of the existing servo assembly.

11. The method according to claim 10, wherein the total release area of the replacement servo assembly is greater than the total release area of the existing servo assembly.

12. The method according to claim 10, wherein the plurality of replacement pistons includes a release piston, the method further comprising providing a replacement cover having a first portion including an inner wall defining a servo pin cavity sized to receive a first end of the replacement servo pin and a second portion including an inner wall defining a release piston cavity sized for sealing engagement with the release piston.

13. The method according to claim 12, wherein the replacement cover includes an apply oil passageway for routing pressurized apply oil to the servo pin cavity.

14. The method according to claim 13, wherein at least one of the servo pin and the release piston provides a fluid-tight barrier between the servo pin cavity and the release piston cavity.

15. The method according to claim 10, wherein the existing automotive transmission servo assembly includes an existing release spring, wherein the method further includes replacing the existing release spring with a replacement spring that has a lower spring force than the existing release spring.

16. The method according to claim 10, wherein the existing automotive transmission servo assembly includes a release spring, wherein the method further includes removing the release spring and not installing a replacement release spring.

17. A method of modifying a release force of an existing automotive transmission servo assembly having an existing servo pin and an existing piston attached to the existing servo pin, the existing servo assembly having a total apply area that is greater than a total release area, the method comprising:
providing a replacement servo assembly including a replacement servo pin and a plurality of replacement pistons, wherein a total release area of the replacement servo assembly is greater than a total apply area of the replacement servo assembly; and
replacing the existing servo pin and piston with the replacement servo assembly;
wherein the existing automotive transmission servo assembly includes an existing release spring, wherein the method further includes replacing the existing release spring with a replacement spring that has a lower spring force than the existing release spring.

18. The method according to claim 17, wherein the total release area of the replacement servo assembly is greater than the total release area of the existing servo assembly.

19. The method according to claim 17, wherein the total apply area of the replacement servo assembly is substantially the same as the total apply area of the existing servo assembly.

20. The method according to claim 17, wherein the plurality of replacement pistons includes a release piston, the method further comprising providing a replacement cover having a first portion including an inner wall defining a servo pin cavity sized to receive a first end of the replacement servo pin and a second portion including an inner wall defining a release piston cavity sized for sealing engagement with the release piston.

21. The method according to claim 20, wherein the replacement cover includes an apply oil passageway for routing pressurized apply oil to the servo pin cavity.

22. The method according to claim 21, wherein at least one of the servo pin and the release piston provides a fluid-tight barrier between the servo pin cavity and the release piston cavity.

23. A method of modifying a release force of an existing automotive transmission servo assembly having an existing servo pin and an existing piston attached to the existing servo pin, the existing servo assembly having a total apply area that is greater than a total release area, the method comprising:
  providing a replacement servo assembly including a replacement servo pin and a plurality of replacement pistons, wherein a total release area of the replacement servo assembly is greater than a total apply area of the replacement servo assembly; and
  replacing the existing servo pin and piston with the replacement servo assembly;
  wherein the existing automotive transmission servo assembly includes a release spring, wherein the method further includes removing the release spring and not installing a replacement release spring.

24. The method according to claim 23, wherein the total release area of the replacement servo assembly is greater than the total release area of the existing servo assembly.

25. The method according to claim 23, wherein the total apply area of the replacement servo assembly is substantially the same as the total apply area of the existing servo assembly.

26. The method according to claim 23, wherein the plurality of replacement pistons includes a release piston, the method further comprising providing a replacement cover having a first portion including an inner wall defining a servo pin cavity sized to receive a first end of the replacement servo pin and a second portion including an inner wall defining a release piston cavity sized for sealing engagement with the release piston.

27. The method according to claim 26, wherein the replacement cover includes an apply oil passageway for routing pressurized apply oil to the servo pin cavity.

28. The method according to claim 27, wherein at least one of the servo pin and the release piston provides a fluid-tight barrier between the servo pin cavity and the release piston cavity.

* * * * *